United States Patent [19]

Tsukagoshi et al.

[11] Patent Number: 5,099,318

[45] Date of Patent: Mar. 24, 1992

[54] THREE TUBE COLOR PROJECTION TELEVISION SYSTEM HAVING AT LEAST ONE TUBE WITHOUT AN INTERFERENCE FILTER

[75] Inventors: Kazuo Tsukagoshi; Hiroshi Kawamura, both of Nagaokakyo, Japan

[73] Assignee: Mitsubishi Denki Kabushiki Kaisha, Tokyo, Japan

[21] Appl. No.: 525,733

[22] Filed: May 21, 1990

[30] Foreign Application Priority Data

Jun. 8, 1989 [JP] Japan .................. 1-146205

[51] Int. Cl.[5] ............................ H04N 9/31
[52] U.S. Cl. ........................ 358/60; 358/64; 358/237; 358/74; 313/474
[58] Field of Search ................. 358/60, 61, 62, 64, 358/29, 237, 253, 74, 243; 313/461, 466, 474, 112

[56] References Cited

U.S. PATENT DOCUMENTS

| | | | |
|---|---|---|---|
| 4,634,926 | 1/1987 | Vriens et al. | 313/474 |
| 4,642,695 | 2/1987 | Iwasaki | 358/237 |
| 4,683,398 | 7/1987 | Vriens et al. | 313/474 |
| 4,804,884 | 2/1989 | Vriens et al. | 313/474 |
| 4,807,014 | 2/1989 | Van Gorkum | 358/237 |
| 4,882,617 | 11/1989 | Vriens | 358/60 |
| 4,914,510 | 4/1990 | Brennesholtz | 358/60 |
| 4,914,511 | 4/1990 | Brennesholtz | 358/60 |
| 4,937,661 | 6/1990 | Van Der Voort | 358/60 |

Primary Examiner—James J. Groody
Assistant Examiner—Sherrie Hsia

[57] ABSTRACT

A projection television system having three cathode ray tubes one of which has a display window, a fluorescent material layer disposed on the innermost surface of the display window, and a multilayered interference filter disposed between the display window and the fluorescent material layer. The multilayer interference filter is composed of a number of alternate layers of high refractive index material and low refractive index material. At most, two of the cathode ray tubes have only the display window and the fluorescent material layer. Images are thereafter produced with high brightness wherein respective supplied beam currents are increased by an amount to compensate for a drop in luminance intensity caused by filter removal. The brightness attained is equal to that of a conventional projection system which includes cathode ray tubes which each utilize multilayer interference filters.

9 Claims, 2 Drawing Sheets

THREE TUBE COLOR PROJECTION TELEVISION SYSTEM HAVING AT LEAST ONE TUBE WITHOUT AN INTERFERENCE FILTER

BACKGROUND OF THE INVENTION

1. Field of the Invention

This invention relates to a projection television system including three cathode ray tubes assembled for the respective three primary colors, i.e., red, green, and blue, having a multilayered interference filter being composed of a number of layers and disposed on the inside of a display window.

2. Description of the Related Art

FIG. 3 of the accompanying drawings shows an existing projection television system. In FIG. 3, a reference numeral 1 designates a screen; 2, a blue cathode ray tube (hereinafter abbreviated as CRT) comprising a display window 2A and a multilayered interference filter 12 disposed on the inside of the display window, the filter 12 being composed of a number of layers which are alternately manufactured from a high refractive index material and a low refractive index material; and 3, a green CRT comprising a display window 3A and a multilayered interference filter 12 disposed on the inside of the display window, the filter being composed of a number of layers which are alternately manufactured from a high refractive index material and a low refractive index material.

Further, 5 designates a system of blue projection lenses which project an image light emitted from the blue CRT 2 onto the screen 1; and 6, a system of green projection lenses which project an image light emitted from the green CRT 3 onto the screen 1.

Furthermore, 10 designates a red CRT which comprises a display window 10A and, like the blue and green CRTs, also a multilayered interference filter 12 disposed on the inside of the display window, the filter being composed of a number of layers manufactured in the manner described above. A system of red projection lenses 7 are located forwardly of the red CRT and project an image light onto the screen.

FIG. 4 is a magnified diagram of an area encircled with dot lines 11 in FIG. 3. In FIG. 4, reference numeral 12 designates a multilayered interference filter; and 9, a layer of fluorescent material formed on the innermost surface of the display window. The multilayered interference filter 12 is disposed between the display window and the fluorescent material layer.

In operation, transmittivity characteristics of each multilayered interference filter 12, which is disposed on the inside of the three display windows 2A, 3A, 10A of the blue, green and red CRTs 2, 3 and 10, is adjusted to be close to a desired central wavelength selected from the emission spectrum of fluorescent material layers 9 of each color. The luminescent intensity distribution is improved by 50% to 60% within the aperture angle ranging from zero to about thirty-five degrees as shown by solid lines 14 in FIG. 4 as compared with a tube without an interference filter, as shown by dot lines 13.

An existing projection television system produces an image onto the screen 1 with high brightness by projecting the lights emitted from the blue, green, red CRTs 2, 3, 10 having the multilayered interference filter 12 via the projection lens of each color.

A problem with the foregoing conventional arrangement is that the production cost of television systems are of increased proportion as the yield impaired by multilayered interference films obliquely manufactured and in consideration of evaporation time fluctuation because a multilayered interference filter disposed on the inside of the display window of each CRT has a structure manufactured from about eleven to twenty layers of evaporation films.

SUMMARY OF THE INVENTION

It is therefore an object of this invention to provide a projection television system which can produce an image as bright as that of the conventional system at low production cost.

According to this invention, there is provided a projection screen television with plural cathode ray tubes wherein one of the cathode ray tubes has a display window, a fluorescent material layer disposed on the innermost surfaces of the display window, and a multilayered interference filter disposed between the display window and the fluorescent material layer and being composed of a number of layers which are alternately manufactured from a high refractive index material and a low refractive index material;

at most two cathode ray tubes, the capacitance allowance of which permits further increase of beam current, and including the display window and the fluorescent material layer; and a beam current which is increased enough to compensate for a drop in luminescent intensity caused by removal of filters corresponding to the at most two cathode ray tubes having no multilayered interference filter, whereby images can be produced with the same brightness as by the existing projection systems wherein all cathode ray tubes of which comprise a multilayered interference filter.

With this projection television system, since the beam current is increased by an amount as much as the luminescence intensity is deteriorated, an image can be produced, in the red CRT having no multilayered interference filter, with the same brightness as in the red CRT having a multilayered interference filter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ACCOMPANYING DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENT

Embodiments of this invention will now be described with reference to the accompanying drawings.

Figure 1:
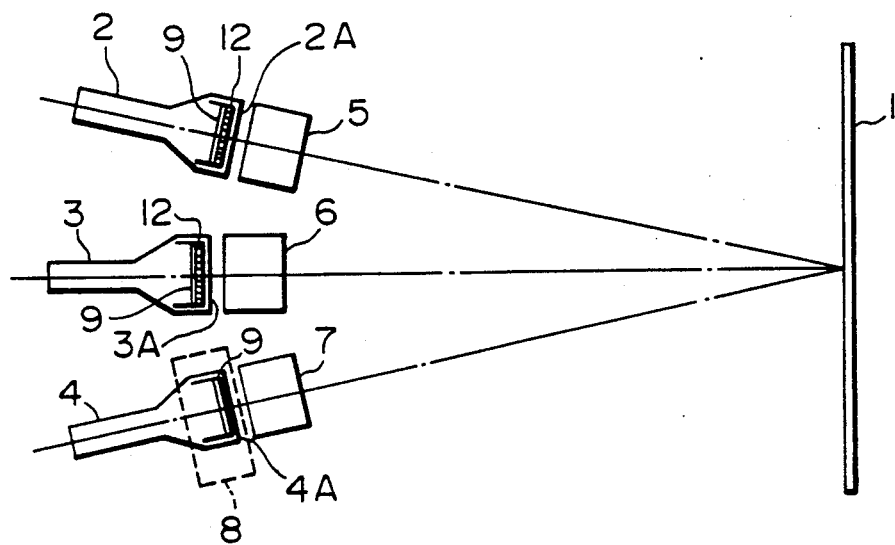
FIG. 1 is a schematic top view of a projection television according to a preferred embodiment of this invention.
Figure 3:
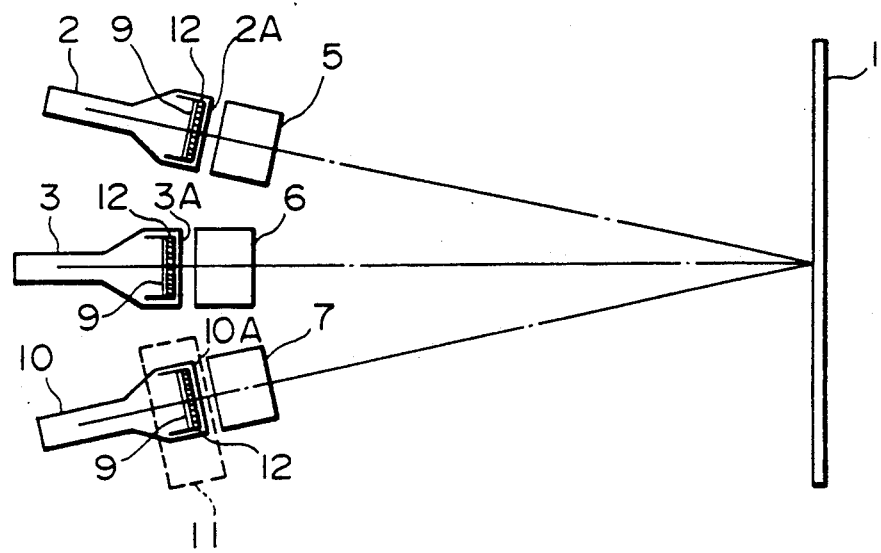
FIG. 3 is a block diagram showing a conventional projection television system.
Figure 4:
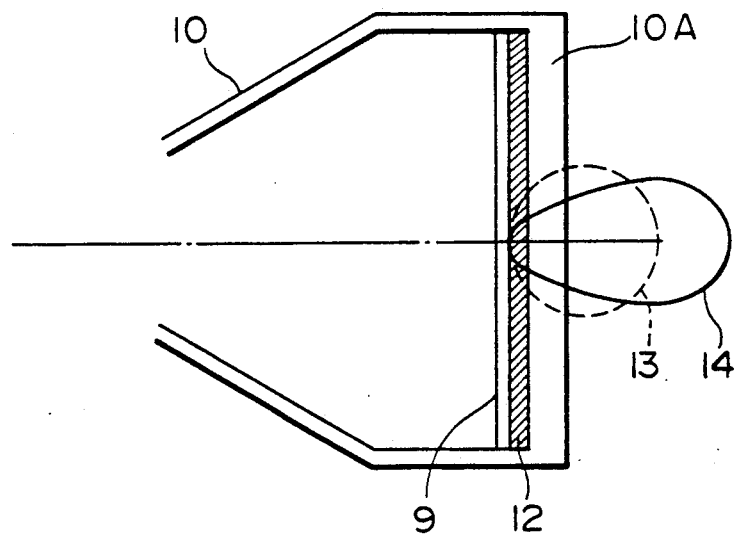
FIG. 4 is a fragmentary enlarged view of FIG. 3.

FIG. 1 shows an embodiment of a projection type television system according to this invention. In FIG. 1, the difference between this embodiment and a conventional system is in that a fluorescent material layer 9 is disposed on the internal surface of a display window 4A of a red CRT 4 having no multilayered interference filter. Since FIG. 1 is identical with FIG. 3 except that the filter is removed from FIG. 1, like reference numerals designate parts similar to those in FIG. 3, with their detailed description being omitted here for clarity.

Figure 2:
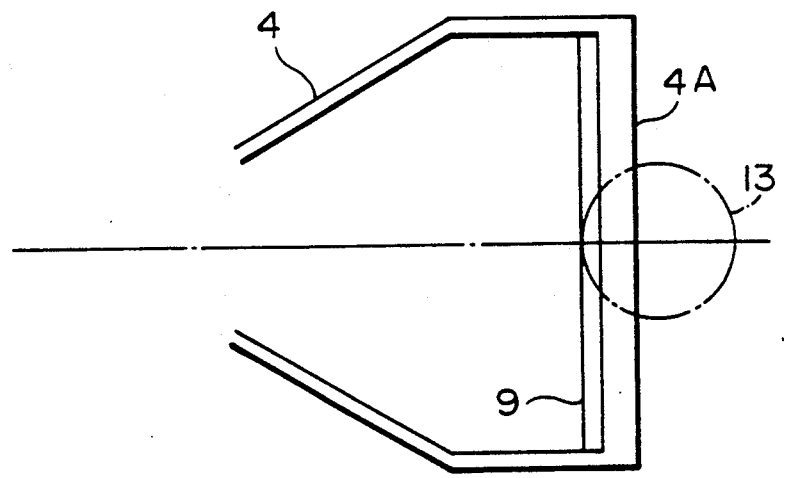
FIG. 2 is an enlarged plan view of a red cathode ray tube.

FIG. 2 is an enlarged view of an area encircled with dot lines 8 in FIG. 1. Numeral 13 designates a luminescent intensity of the preferred embodiment.

In FIG. 1, since a multilayered interference filter 12 is disposed on each inside surface of the display windows 2A, 3A of the blue, green CRTs 2, 3, about 50% of the luminescent intensity can be increased as compared with a cathode ray tube without a filter as described above.

As is known in the conventional projection television system, when projecting an image light onto the screen 1 emitted from the CRTs, i.e. the red, green and blue CRTs 2, 3, 4, via a system of projection lenses 5, 6, 7, the beam current ratio of red, green and blue colors approximately requires 0.4 to 1 to 0.85 to produce white.

With this beam current ratio, it will be understood that the ratio of beam current for the red cathode ray tube increases as shown below when the multilayered interference filter is removed from the red CRT 4;

red 0.6: green 1: blue 0.85.

Thus, even if a multilayered interference filter is removed from the red CRT 4, a beam current supplied to the red CRT 4 still requires less than those of the blue and green CRTs 2, 3, which prevents the life of the fluorescent material layer 9 from being shortened and also the deterioration of white on the screen (1).

Although the present invention has been described with reference to a red cathode ray tube having no interference filter inside of it, it is to be understood that the invention can be realized with another cathode ray tube having a corresponding interference filter removed in conjunction with the red cathode ray tube, if the other one, i.e., a blue cathode ray tube, has an allowance for further increase of beam current.

Other forms of preferred embodiment can also be accomplished by utilizing a beam current allowance of other respective cathode ray tubes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection television system including three cathode ray tubes corresponding respectively to three primary colors red, green and blue, the projection television system comprising:
   first and second ones of the cathode ray tubes each having a display window, a fluorescent material layer disposed on an innermost surface of said display window and a multilayered interference filter, disposed between said display window and said fluorescent material layer, being composed of a number of alternate layers of high refractive index material and low refractive index material; and
   a third one of the cathode ray tubes having a display window with a fluorescent material layer formed on an innermost surface thereof,
   beam current of said third cathode ray tube being increased by an amount equivalent to deterioration of luminescent intensity caused by removal of respective multilayered interference filter therefrom, whereby images can be produced with brightness equivalent to that of projection systems in which all cathode ray tubes include a respective multilayered interference filter.

2. A projection television system including three cathode ray tubes corresponding respectively to three primary colors red, green, and blue, the projection television system comprising:
   a green cathode ray tube having a display window, a fluorescent material disposed on an innermost surface of the display window and a multilayered interference filter, disposed between the display window and the fluorescent material, being composed of a number of alternate layers of high refractive index material and low refractive index material;
   a blue cathode ray tube having a display window, a fluorescent material disposed on an innermost surface of the display window and a multilayered interference filter, disposed between the display window and the fluorescent material, being composed of a number of alternate layers of high refractive index material and low refractive index material; and
   a red cathode ray rube having a display window and a fluorescent material disposed on an innermost surface of the display window,
   beam current of said red cathode ray tube is increased by an amount equivalent to deterioration of luminescent intensity caused by removal of a respective multilayered interference filter from said red cathode ray tube, whereby images can be produced with brightness equivalent to that of projection systems in which all cathode ray tubes include a respective multilayered interference filter.

3. A projection television system comprising: three cathode ray tubes, each respectively corresponding to one of three primary colors red, green and blue and consisting of
   a display window, and
   a fluorescent material layer disposed on an innermost surface of the display window,
   a first of the three cathode ray tubes further including a multilayered interference filter disposed between the respective display window and fluorescent material layer, corresponding beam current of a second and third of the three cathode ray tubes which do not include respective multilayered interference filters is increased by an amount equivalent to deterioration of luminance intensity occurring due to lack of respective multilayered interference filters,
   produced images of the projection television system being of equivalent brightness as that of projection systems in which all cathode ray tubes include a respective multilayered interference filter.

4. The projection television system of claim 3, the green cathode ray tube corresponding to said first of the three cathode ray tubes.

5. A method of projecting an image using a projection system including three cathode ray tubes, corresponding respectively to red, green and blue, each having a display window with a fluorescent material layer disposed on an inner surface thereof comprising the steps of:

inserting a multi-layered interference filter of alternating layers of low and high refractive material between the face plate and fluorescent material layer of a first one of the cathode ray tubes; and increasing beam current of a second and third one of the cathode ray tubes which do not include a multi-layered interference filter;

said step of increasing beam current resulting in production of images with brightness equivalent to that of projection systems in which all cathode ray tubes include a respective multi-layer interference filter.

6. The method of projecting an image of claim 5, said step of inserting comprising inserting a multi-layered interference filter into the green cathode ray tube.

7. A method of projecting an image using a projection system including three cathode ray tubes, corresponding respectively to red, green and blue, each having a display window with a fluorescent material layer disposed on an inner surface thereof comprising the steps of:

inserting a multi-layered interference filter of alternating layers of low and high refractive material between the face plate and fluorescent material layer of a first and second one of the cathode ray tubes; and increasing beam current of a third one of the cathode ray tubes which does not include a multi-layered interference filter, said step of increasing beam current resulting in production of images with brightness equivalent to that of projection systems in which all cathode ray tubes include a respective multi-layer interference filter.

8. The method of projecting an image of claim 7, said step of increasing beam current comprising increasing beam current of the red cathode ray tube.

9. The projection television system of claim 1, the red cathode ray tube corresponding to said third one of the cathode ray tubes.

* * * * *